United States Patent
Huang et al.

(10) Patent No.: US 9,537,144 B2
(45) Date of Patent: Jan. 3, 2017

(54) SINGLE LITHIUM ION CONDUCTOR AS BINDER IN LITHIUM-SULFUR OR SILICON-SULFUR BATTERY

(71) Applicant: GM GLOBAL TECHNOLOGY OPERATIONS LLC, Detroit, MI (US)

(72) Inventors: Xiaosong Huang, Novi, MI (US); Mei Cai, Bloomfield Hills, MI (US); Mark W. Verbrugge, Troy, MI (US); Li Yang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 653 days.

(21) Appl. No.: 13/836,101

(22) Filed: Mar. 15, 2013

(65) Prior Publication Data

US 2014/0265557 A1  Sep. 18, 2014

(51) Int. Cl.
| | |
|---|---|
| *H01M 4/62* | (2006.01) |
| *H01M 10/052* | (2010.01) |
| *H01M 4/36* | (2006.01) |
| *H02J 7/00* | (2006.01) |
| *H01M 4/137* | (2010.01) |
| *H01M 4/60* | (2006.01) |

(52) U.S. Cl.
CPC .............. *H01M 4/364* (2013.01); *H01M 4/137* (2013.01); *H01M 4/604* (2013.01); *H01M 4/622* (2013.01); *H01M 4/623* (2013.01); *H02J 7/00* (2013.01); *H01M 10/052* (2013.01); *Y02E 60/122* (2013.01); *Y02T 10/7011* (2013.01)

(58) Field of Classification Search
CPC ............ H01M 2004/028; H01M 4/136; H01M 4/5815; H01M 4/621; H01M 4/622; H01M 4/623
See application file for complete search history.

(56) References Cited

U.S. PATENT DOCUMENTS

| | | | |
|---|---|---|---|
| 6,576,370 B1 * | 6/2003 | Nakagiri et al. | 429/231.95 |
| 8,974,946 B2 * | 3/2015 | Cai et al. | 429/144 |
| 2008/0187838 A1 * | 8/2008 | Le | 429/231.95 |
| 2011/0052998 A1 * | 3/2011 | Liang et al. | 429/300 |
| 2012/0145428 A1 * | 6/2012 | Tokunaga et al. | 173/217 |
| 2013/0115524 A1 * | 5/2013 | Garsuch et al. | 429/402 |
| 2013/0164620 A1 * | 6/2013 | Woo et al. | 429/218.1 |

FOREIGN PATENT DOCUMENTS

| | | | |
|---|---|---|---|
| CN | 102544589 A | | 7/2012 |
| WO | WO 2012/100301 | * | 8/2012 |

OTHER PUBLICATIONS

Kerr, J., Yang, L., Cheng, J., Zhang, H., Driscoll, P., Chmiola, J.-Electrolytes-R&D for Adanced Lithium Batteries. Interfacial Behavior of Electrolytes, Lawrence Berkeley National Labratory, May 11, 2011.*

Kerr, John B.; Yang, Li; Cheng, Jianli; Zhang, Hanjun; Driscoll, Peter; Chmiola, John, "Electrolytes—R&D for Advanced Lithium Batteries. Interfacial Behavior of Electrolytes", Lawrence Berkeley National Laboratory, Project ID #: ES089, May 11, 2011.

* cited by examiner

*Primary Examiner* — Anca Eoff
(74) *Attorney, Agent, or Firm* — Quinn Law Group, PLLC

(57) ABSTRACT

A sulfur-containing electrode has a binder comprising a single-lithium ion conductor. The electrode may be used a cathode in a lithium-sulfur or silicon-sulfur battery.

10 Claims, 1 Drawing Sheet

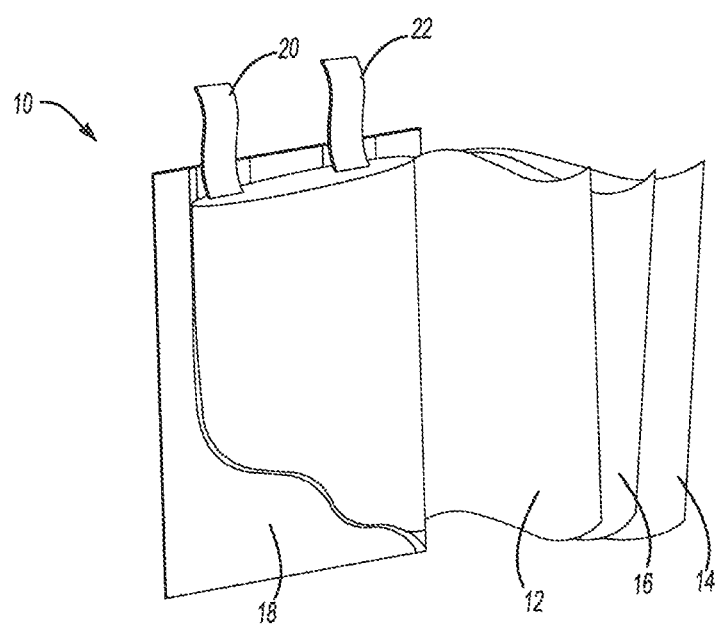

SINGLE LITHIUM ION CONDUCTOR AS BINDER IN LITHIUM-SULFUR OR SILICON-SULFUR BATTERY

FIELD

The present disclosure relates to batteries, particularly to batteries with sulfur cathodes, and especially to the sulfur cathodes themselves.

BACKGROUND

This section provides background information related to the present disclosure that is not necessarily prior art.

Electric-based vehicles or EVs (e.g., hybrid electric vehicles (HEV), battery electric vehicles (BEV), plug-in HEVs, and extended-range electric vehicles (EREV)) require efficient, low-cost, and safe energy storage systems with high energy density and high power capability. Lithium ion batteries can be used as a power source in many applications ranging from vehicles to portable electronics such as laptop computers, cellular phones, and so on. The EVs powered by the current lithium cobalt or lithium-iron phosphate batteries often have a driving range of less than 100 miles (160 km) per charge, while longer driving ranges would be desirable.

A battery based on Li—S chemistry offers an attractive technology that meets the two most pressing issues for electric-based transportation, the needs for low cost and high specific density. Li—S battery technology has been the subject of intensive research and development both in academia and in industry due to its high theoretical specific energy of 2600 Wh/kg as well as the low cost of sulfur. The theoretical capacity of sulfur via two-electron reduction (S+2Li++2e-$\leftrightarrow$Li$_2$S), is 1672 mAh/g (elemental sulfur is reduced to S$^{-2}$ anion). The discharge process starts from a crown S8 molecule and proceeds though reduction to higher-order polysulfide anions (Li$_2$S$_8$, Li$_2$S$_6$) at a high voltage plateau (2.3-2.4 V), followed by further reduction to lower-order polysulfides (Li$_2$S$_4$, Li$_2$S$_2$) at a low voltage plateau (2.1 V), and terminates with the Li$_2$S product. During the charge process, Li$_2$S is oxidized back to S8 through the intermediate polysulfide anions S$_x$. The S$_x$ polysulfides generated at the cathode are soluble in the electrolyte and can migrate to the anode where they react with the lithium electrode in a parasitic fashion to generate lower-order polysulfides, which diffuse back to the cathode and regenerate the higher forms of polysulfide. Y. V. Mikhaylik & J. R. Akridge, "Polysulfide Shuttle Study in the Li/S Battery System," *J. Electrochem. Soc.,* 151, A1969-A1976 (2004) and J. R. Akridge, Y. V. Mikhaylik & N. White, "Li/S fundamental chemistry and application to high-performance rechargeable batteries," *Solid State Ionics,* 175, 243-245 (2005) describe this shuttle effect, which leads to decreased sulfur utilization, self-discharge, poor ability to repeatedly cycle through oxidation and reduction, and reduced columbic efficiency of the battery. The insulating nature of S and Li$_2$S results in poor electrode rechargeablity and limited rate capability. In addition, an 80% volume expansion takes place during discharge. Overall, these factors preclude the commercialization of Li—S batteries for EVs.

The theoretical energy density of a Si—S battery is comparable to that of a Li—S battery. However, because a Si—S battery operates on the same sulfur chemistry, it suffers from the same problem of polysulfide diffusion to the anode.

To circumvent these obstacles, extensive effort has been devoted to the development of better sulfur cathodes, which has mainly relied on infiltration or in situ growth of sulfur into or onto conductive scaffolds, such as conductive polymers (e.g., polythiophene, polypyrrole, and polyaniline) and porous carbons (e.g., active carbons, mesoporous carbons, hollow carbon spheres, carbon fibers, and graphene). It has been found that, generally, the incorporation of sulfur within conductive polymers results in sulfur/polymer cathodes with improved capacity and cycling stability. The sulfur and the polymer may be crosslinked, leading to electrodes with further improved cycling life. Compared with polymeric scaffolds, carbon scaffolds offer many advantages, such as better stability and conductivity, low cost, and controllable pore structure, which make them more attractive candidates for sulfur cathodes. Polymers (e.g., poly(ethylene oxide) and poly(3,4-ethylenedioxythiophene)-poly(styrene sulfonate)) may be coated on the carbon/sulfur composites to further improve the cycling life and coulomb efficiency. However, despite extensive efforts being made, current sulfur cathodes still fail to meet the requirement of high-performance Li/S batteries. Current sulfur cathodes do not sufficiently retard polysulfide migration to be able to prolong cathode cycling life. During discharge of current sulfur/carbon cathodes, the cyclic S$_8$ molecules are converted to polysulfides (Li$_2$S$_n$, 2<n<8) that are smaller than the S$_8$ molecules. Driven by the concentration gradient, the polysulfides dissolved in the electrolyte unavoidably diffuse away from the cathodes, causing fast capacity fading with poor cycling life. Nevertheless, a functioning cathode also requires effective lithium ion transport between the electrolyte and the electrodes. Because electrolyte molecules, lithium ions, and the polysulfides exhibit comparable diffusion coefficients, carbon materials that are able to retard the outward polysulfide diffusion will also retard the transport of electrolyte and lithium ions, resulting in poor rate performance or even dysfunction of the cathode. This fundamental dilemma has until now prevented the art from realizing the great potential of Li/S batteries.

Silicon sulfur batteries also use a sulfur cathode and, therefore, are subject to the same issues of polysulfide migration.

SUMMARY

This section provides a general summary and not necessarily a comprehensive disclosure of the invention and all of its features.

Disclosed is a sulfur-containing electrode that has a binder including a polymer that is a single-lithium ion conductor.

Also disclosed are lithium-sulfur and silicon-sulfur batteries with sulfur-containing cathodes that have a binder including a polymer that is a single-lithium ion conductor. In various embodiments the single-lithium ion conductor is a polymeric anion with associated lithium cations, such as a lithium salt of a polymer, or a cation exchange polymer.

Further disclosed is a battery including the electrode as a cathode.

Also disclosed is a method of operating an electrical device, comprising providing electricity to the device with a lithium sulfur battery or a silicon sulfur battery in which the battery has a sulfur cathode with a binder including a polymer that is a single-lithium ion conductor such as a polymeric anion with associated lithium cations or a cation exchange polymer. The single-lithium ion conductor retains polysulfide anions in the cathode, resulting in improved cycling stability (capacity retention with repeated cycles of discharge and recharge) for the battery.

Also disclosed is a method of increasing the capacity retention of Li/S and Si/S batteries by using a sulfur cathode with a binder including a polymer that is a single-lithium ion conductor such as a polymeric anion with associated lithium cations or a cation exchange polymer to retain polysulfide anions in the cathode.

In discussing the disclosed electrodes and batteries and methods of making and using them, "a," "an," "the," "at least one," and "one or more" are used interchangeably to indicate that at least one of the item is present; a plurality of such items may be present unless the context clearly indicates otherwise. The terms "comprises," "comprising," "including," and "having," are inclusive and therefore specify the presence of stated items, but do not preclude the presence of other items. The term "or" includes any and all combinations of one or more of the associated listed items. When the terms first, second, third, etc. are used to differentiate various items from each other, these designations are merely for convenience and do not limit the items.

Further areas of applicability will become apparent from the description provided herein. The description and specific examples in this summary are intended for purposes of illustration only and are not intended to limit the scope of the present disclosure.

DRAWING

The drawing illustrates an embodiment of the disclosed technology.

The FIGURE is a schematic illustration of one configuration for a battery with a sulfur cathode.

DETAILED DESCRIPTION

A detailed description of exemplary, nonlimiting embodiments follows.

The FIGURE illustrates one configuration for a cell or battery 10 in which sheets of an anode 12, which may be a lithium-containing or silicon-containing anode, and a sulfur-containing cathode 14, separated by a sheet of a polymer separator 16, are wound together or stacked in alternation inside of a cell enclosure 18. The polymer separator 16 is electrically nonconductive and ion-pervious via the electrolyte solution that fills its open pores. For example the polymer separator 16 may be a microporous polypropylene or polyethylene sheet. The enclosure 18 contains a nonaqueous lithium salt electrolyte solution to conduct lithium ions between the electrodes. The anode connects to an anode current collector 20; the sulfur-containing cathode connects to a cathode current collector 22. The terminals can be connected in a circuit to either discharge the battery by connecting a load (not shown) in the circuit or charge the battery by connecting an external power source (not shown).

The battery or cell 10 can be shaped and configured to specific uses as is known in the art. For examples, the loads may be electric motors for automotive vehicles and aerospace applications, consumer electronics such as laptop computers and cellular phones, and other consumer goods such as cordless power tools, to name but a few. The load may also be a power-generating apparatus that charges the battery 10 for purposes of storing energy. For instance, the tendency of windmills and solar panel displays to variably or intermittently generate electricity often results in a need to store surplus energy for later use. Batteries with sulfur-containing cathodes may be configured in four general ways:

(1) as small, solid-body cylinders such as laptop computer batteries; (2) as large, solid-body cylinders with threaded terminals; (3) as soft, flat pouches, such as cell phone batteries with flat terminals flush to the body of the battery; and (4) as in plastic cases with large terminals in the form of aluminum and copper sheets, such as battery packs for automotive vehicles.

The battery 10 can optionally include a wide range of other components known in the art, such as gaskets, seals, terminal caps, and so on for performance-related or other practical purposes. The battery 10 may also be connected in an appropriately designed combination of series and parallel electrical connections with other similar batteries to produce a greater voltage output and current if the load so requires.

The battery 10 with a sulfur-containing cathode 14 can generate a useful electric current during battery discharge by way of reversible electrochemical reactions that occur when an external circuit is closed to connect the anode 12 and the cathode 14 at a time when the cathode contains reducible sulfur. The average chemical potential difference between the cathode 14 and the anode 12 drives the electrons produced by the oxidation of lithium at the anode 12 through an external circuit towards the cathode 14. Concomitantly, lithium ions produced at the anode are carried by the electrolyte solution through the microporous polymer separator 16 and towards the cathode 14. At the same time with $Li^+$ ions entering the solution at the anode, $Li^+$ ions from the solution recombine with electrons at interface between the electrolyte and the cathode, and the lithium concentration in the active material of the cathode increases. The electrons flowing through an external circuit reduce the sulfur in the cathode 14. The electric current passing through the external circuit can be harnessed and directed through the load until the sulfur in cathode 14 is fully reduced and the capacity of the battery 10 is diminished below the useful level for the particular practical application at hand.

The lithium sulfur or silicon sulfur battery 10 can be charged at any time by applying an external power source to the battery 10 to reverse the electrochemical reactions that occur during battery discharge and restore electrical energy. The connection of an external power source to the battery 10 compels the otherwise non-spontaneous oxidation of the lithium polysulfides at the cathode 14 to produce electrons and lithium ions. The electrons, which flow back towards the anode 12 through an external circuit, and the lithium ions, which are carried by the electrolyte across the polymer separator 16 back towards the anode 12, reunite at the anode 12 and replenish it with lithium for consumption during the next battery discharge cycle.

The anode 12 has a base electrode material such as lithium metal, which can serve as the anode active material. The lithium metal may be in the form of, for example, a lithium metal foil or a thin lithium film that has been deposited on the anode current collector. The lithium metal may also be in the form of a lithium alloy such as, for example, a lithium-tin alloy, a lithium aluminum alloy, a lithium magnesium alloy, a lithium zinc alloy, a lithium silicon alloy (which used as the electrode in a sulfur-silicon battery), or some combination of these.

The anode 12 may alternatively include any lithium host material that can sufficiently undergo lithium intercalation and deintercalation while functioning as the anode of the lithium ion battery 10. Examples of host materials include electrically conductive carbonaceous materials such as carbon, graphite, carbon nanotubes, graphene, and petroleum coke. Mixtures of such host materials may also be used. Graphite is widely utilized to form the anode because it is inexpensive, exhibits favorable lithium intercalation and deintercalation characteristics, is relatively non-reactive, and can store lithium in quantities that produce a relatively high energy density. Commercial forms of graphite that may be used to fabricate the anode 12 are available from, for example, Timcal Graphite & Carbon, headquartered in Bodio, Switzerland, Lonza Group, headquartered in Basel, Switzerland, Superior Graphite, headquartered in Chicago, Ill. USA, or Hitachi Chemical Company, located in Japan.

In silicon sulfur batteries, the anode is a porous silicone anode containing a lithium silicon alloy, for example prepared with silicon nanoparticles made from high purity silicon or prepared with silicon nanowires, especially in carpet/brush type morphology.

The anode includes a polymer binder material in sufficient amount to structurally hold the lithium host material together. Nonlimiting examples of suitable binder polymers include polyvinylidene fluoride, polyacrylonitrile, polyethylene oxide, polyethylene, polypropylene, polytetrafluoroethylene, polybutadiene, polystyrene, polyalkyl acrylates and methacrylates, ethylene-(propylene-diene-monomer)-copolymer (EPDM) rubber, copolymers of styrene and butadiene, and mixtures of such polymers. Caboxymethyl cellulose is one preferred binder for silicon-containing anodes.

The anode current collector 20 may be formed from copper or any other appropriate electrically conductive material known to skilled artisans.

Cathode 14 is a porous sulfur-containing electrode. A porous sulfur-containing electrode in general has porous conductive carbonaceous material or other host material, e.g., conductive polymers or metal oxides, such as any of those already mentioned as useful in the electrode, that is infiltrated with sulfur, which in its elemental form is a crown $S_8$ molecule. As the battery is discharged, the cyclic $S_8$ is reduced through a series of increasingly smaller volume lithium sulfide compounds via two-electron reduction (from elemental sulfur through the series $Li_2S_8$, $Li_2S_6$, $Li_2S_4$, $Li_2S_2$). As the battery is charged, the sulfides are oxidized back to crown $S_8$. The materials of the positive electrode, including the active lithium-transition metal compound and conductive carbon or other conductive host material, are held together with a binder that is or includes a single-lithium ion conductor.

The single-lithium ion conductors may be any polyanion-lithium cation material or a cation exchange polymer, including as nonlimiting examples polymers with anionic acid groups such as carboxyl groups, sulfonic acid groups, phosphoric and phosphonic acid groups, and boric acid groups with associated lithium cations, polymers with ammonium groups and associated lithium cations, and polymers functionalized with lithium bis(trifluoromethanesulfonyl)imide groups or similar groups.

Some examples of specific polymeric anions with associated lithium cations are:

(i) the lithium salts of polymers and copolymers of ethylenically unsaturated acids such as acrylic acid, methacrylic acid, crotonic acid, α-ethacrylic acid, vinylacetic acid, acryloxypropionic acid, maleic acid and its monoesters, itaconic acid and its monoesters, fumaric acid and its monoesters, mesaconic acid and its monoesters, citraconic acid and its monoesters, 4-vinylbenzoic acid, and anhydrides of these; sulfopropyl acrylate, sulfoethyl acrylate, sulfoethyl methacrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate and phosphonopropyl methacrylate, and the like, including polyacrylic acid, polymethacrylic acid, poly[ethylene-co-(maleic acid)], poly[styrene-co-(maleic acid)], poly[styrene-co-(acrylic acid)], poly[vinylpyridine-co-(methacrylic acid)], poly[(vinylidene chloride)-co-ethylene co-(acrylic acid)], poly[(methyl vinyl ether)-co-(maleic acid)], polyvinylbenzoic acid, and poly(perfluorosulfonic acid), poly[(vinyl chloride)-co-(vinyl acetate)-co-(maleic acid)], poly[(ethylene-co-(acrylic acid)], and poly[(ethylene-co-(methacrylic acid)];

(ii) the lithium salts of carboxylated polyvinyl chloride;

(iii) the lithium salts of carboxymethyl celluloses and lithium alginates;

(iv) the lithium salts of polyundecylenic acid and copolymers of olefins and undecylenic acid;

(v) the lithium salts of polymers made by acidification of a polymer followed by neutralization with lithium cations such as lithium salts of maleated or fumerated polymers and monoesters of these, such as maleated polyolefins such as maleated polypropylene and maleated polyethylene, maleated ethylene-vinyl acetate copolymers, maleated ethylene-methyl acrylate copolymers, maleated ethylene-propylene copolymers, maleated styrene-ethylene-butene-styrene triblock copolymers, maleated polybutadiene, and maleated ethylene-propylene-diene copolymers;

(vi) the lithium salts of novolac epoxy resins;

(vii) lithium salts of perfluorinated polysulfonic acids such as sulfonated tetrafluoroethylene-based fluoropolymer copolymers, which are commercially available under the tradename NAFION® from Du Pont;

(viii) a polymer having a polysulfone backbone with pendent lithium bis(trifluoromethanesulfonyl)imide groups; and combinations of these.

The binder is typically included in the cathode in an amount of from about 0.1 weight percent or about 1 weight percent to about 60 weight percent, preferably from about 2 weight percent to about 40 weight percent.

The single-lithium ion conductor may be the only binder in the cathode, or other binders may be used. When other binders are used, the single-lithium ion conductor may be from about 5% or about 10% by weight or about 25% by weight to about 90% by weight or to nearly 100% by weight of the total binder weight. Preferably the single-lithium ion conductor is used as the only binder in the cathode. As the binder, it wets out and at least partially encapsulates the sulfur/carbon particles, serving as a physical barrier and, in the case of a polymeric lithium salt, as a negatively-charged ionic barrier to the polysulfides produced during battery discharge.

In one method, a sulfur-containing cathode may be prepared using a high-pore-volume carbon scaffold, then infiltrating the scaffold with molten crown $S_8$. Porous carbon particles may be synthesized using an aerosol or spraying process. To control the pore structure, surfactants (e.g., surfactants that are block copolymers of ethylene oxide and propylene oxide, such as those sold by BASF under the trademark PLURONIC®), silicate clusters, and silica colloidal particles of different sizes can be used as the porogens (templates) for forming pores. Pore volume may be controlled by adjusting the amount of the porogens added. Carbonization conditions (e.g., temperature and time) are controlled to ensure high electrical conductivity. Carbon nanotube networks (CNTs) may also be added into the carbon particle precursor solutions to further improve the conductivity and the rate capability. High pore volume permits high sulfur loading; however, this must be balanced against a need to maintain adequate electrical conductivity.

For example, in one synthesis of highly porous carbon particles with a surface area of 1219.4 m$^2$/g and a pore volume of 4.01 cm$^3$/g, 2-3 g of sucrose and 4 g of colloidal silica solution (20-30 nm) were added to 10 mL of 0.1 M until completely dissolved. The resulting solution was employed as a precursor solution and was then sent through the aerosol atomizer (TSI model 3076) to produce aerosol droplets using 40 psi nitrogen as a carrier gas. The resulting particles were heated to 900° C. at a rate of 3° C./min and held for 4 h under nitrogen flow. A black powder was then collected and immersed in a 5 M NaOH solution and stirred for 48 h. The solution was then filtered, rinsed several times with deionized water, and dried in an oven at 100° C. The porous conductive carbon or other host material (e.g., conductive polymers or metal oxides) is infiltrated with molten sulfur and then mixed with the binder that is or includes the polymeric single-lithium ion conductor, which may be dissolved or dispersed in a suitable organic solvent, for example, N-methyl pyrrolidone, or dispersed in an aqueous medium and optionally with additives and formed into an electrode, for example by slot die coating the slurry onto the cathode current collector 22 or other known techniques for forming sulfur cathodes.

The cathode current collector 22 may an aluminum foil or another appropriate electrically-conductive material An electrically insulating separator 16 is generally included between the electrodes, such as in batteries configured as shown in the FIGURE. The separator must be permeable to the ions, particularly lithium ions, to ensure the ion transport for lithium ions between the positive and the negative electrodes. Nonlimiting examples of suitable separator materials include polyolefins, which may be homopolymers or a random or block copolymers, either linear or branched, including polyethylene, polypropylene, and blends and copolymers of these; polyethylene terephthalate, polyvinylidene fluoride, polyamides (nylons), polyurethanes, polycarbonates, polyesters, polyetheretherketones (PEEK), polyethersulfones (PES), polyimides (PI), polyamide-imides, polyethers, polyoxymethylene (acetal), polybutylene terephthalate, polyethylene naphthenate, polybutene, acrylonitrile-butadiene styrene copolymers (ABS), styrene copolymers, polymethyl methacrylate, polyvinyl chloride, polysiloxane polymers (such as polydimethylsiloxane (PDMS)), polybenzimidazole, polybenzoxazole, polyphenylenes, polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers, polyaramides, polyphenylene oxide, and combinations of these.

The microporous polymer separator 16 may be a woven or nonwoven single layer or a multi-layer laminate fabricated in either a dry or wet process. In a dry process, a polymer film is stretched to make lithium ion-permeable holes between crystalline regions. In a wet process, a material is dissolved or otherwise removed from the polymer film leaving lithium ion-permeable holes. For example, in one example, the polymer separator may be a single layer of the polyolefin. In another example, a single layer of one or a combination of any of the polymers from which the microporous polymer separator 16 may be formed (e.g., the polyolefin or one or more of the other polymers listed above for the separator 16). In certain embodiments a nonwoven fabric is preferred due to its random fiber orientation. As another example, multiple discrete layers of similar or dissimilar polyolefins or other polymers for the separator 16 may be assembled in making the microporous polymer separator 16. In one example, a discrete layer of one or more of the polymers may be coated on a discrete layer of the polyolefin for the separator 16. Further, the polyolefin (and/or other polymer) layer, and any other optional polymer layers, may further be included in the microporous polymer separator 16 as a fibrous layer to help provide the microporous polymer separator 16 with appropriate structural and porosity characteristics. A more complete discussion of single and multi-layer lithium ion battery separators, and the dry and wet processes that may be used to make them, can be found in P. Arora and Z. Zhang, "Battery Separators," Chem. Rev., 104, 4424-4427 (2004).

Typically, separators are about 25 micrometers in thickness.

Suitable electrolytes for the lithium sulfur or silicon sulfur batteries include nonaqueous solutions of lithium salts. Nonlimiting examples of suitable lithium salts include lithium bis(trifluoromethane sulfone)imide, lithium hexafluorophosphate, lithium hexafluoroarsenate, lithium bis(trifluorosulfonylimide), lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrafluoroborate, lithium perchlorate, lithium tetrachloroaluminate, lithium chloride, and combinations of these.

The lithium salt is dissolved in a non-aqueous solvent, which may be selected from: ethylene carbonate, propylene carbonate, butylene carbonate, dimethyl carbonate, diethyl carbonate, ethylmethyl carbonate, methylpropyl carbonate, butylmethyl carbonate, ethylpropyl carbonate, dipropyl carbonate, cyclopentanone, sulfolane, dimethyl sulfoxide, 3-methyl-1,3-oxazolidine-2-one, γ-butyrolactone, 1,2-diethoxymethane, tetrahydrofuran, 2-methyltetrahydrofuran, 1,3-dioxolane, dimethoxyethane, methyl acetate, ethyl acetate, nitromethane, 1,3-propane sultone, γ-valerolactone, methyl isobutyryl acetate, 2-methoxyethyl acetate, 2-ethoxyethyl acetate, diethyl oxalate, or an ionic liquid, and mixtures of two or more of these solvents.

The electrolyte may further include one or more appropriate additives, such as any of those disclosed in S. S. Zhang, "J. Power Sources," 162 (2006) 1379-1394 (available at www.sciencedirect.com), for example additives to increase the mobility of lithium ions.

When the lithium sulfur or silicon sulfur battery discharges, the cathode with the binder of or containing the single-lithium ion conductor slows, prevents, or at least partially prevents diffusion of polysulfide compounds from the cathode. This results in improved cycling stability (capacity retention with repeated cycles of discharge and recharge of the battery).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A sulfur cathode comprising:
    a porous conductive carbonaceous material infiltrated with sulfur that has a crown $S_8$ elemental form and is transitionable to an intermediate polysulfide compound having a structure represented by $Li_2S_n$, wherein $2 \leq n \leq 8$, via two-electron reduction; and a binder binding together and at least partially encapsulating the porous conductive carbonaceous material and the sulfur to form a physical barrier which at least partially prevents diffusion of the intermediate polysulfide compound from the sulfur cathode;

wherein the binder includes a polymer that is a single-lithium ion conductor formed from a polymeric anion having associated lithium cations;

wherein the polymeric anion having associated lithium cations is a polymer having a polysulfone backbone and pendent lithium bis(trifluoromethanesulfonyl)imide groups.

2. The sulfur cathode according to claim 1, wherein the polymeric anion having associated lithium cations is present in the sulfur cathode in an amount of from about 0.1 parts by weight to about 60 parts by weight based on 100 parts by weight of the sulfur cathode.

3. The sulfur cathode according to claim 1, wherein the polymeric anion having associated lithium cations is present in the binder in an amount of from about 5 parts by weight to about 100 parts by weight based on 100 parts by weight of the binder.

4. A method of forming a sulfur cathode, the method comprising:

forming a porous conductive carbonaceous material;

infiltrating the porous conductive carbonaceous material with molten sulfur that has a crown $S_8$ elemental form and is transitionable to an intermediate polysulfide compound having a structure represented by $Li_2S_n$, wherein 2≤n≤8, via two-electron reduction to form a precursor;

mixing the precursor with a binder comprising a polymer that is a single-lithium ion conductor formed from a polymeric anion having associated lithium cations to form a slurry; and slot die coating the slurry onto a current collector to thereby form the sulfur cathode;

wherein the binder binds together and at least partially encapsulates the porous conductive carbonaceous material and the sulfur to form a physical barrier which at least partially prevents diffusion of the intermediate polysulfide compound from the sulfur cathode;

wherein mixing includes incorporating the polymeric anion having associated lithium cations with the precursor so that the polymeric anion having associated lithium cations is present in the sulfur cathode in an amount of from about 2 parts by weight to about 40 parts by weight based on 100 parts by weight of the sulfur cathode;

wherein the polymeric anion having associated lithium cations is a polymer having a polysulfone backbone with pendent lithium bis(trifluoromethanesulfonyl)imide groups.

5. The method according to claim 4, wherein mixing includes incorporating the polymeric anion having associated lithium cations with the precursor so that the polymeric anion having associated lithium cations is present in the binder in an amount of from about 5 parts by weight to about 100 parts by weight based on 100 parts by weight of the binder.

6. The method according to claim 4, wherein mixing includes incorporating the precursor with the binder, wherein the binder comprises only one polymeric anion having associated lithium cations.

7. A battery comprising:

(a) a sulfur cathode comprising:

a porous conductive carbonaceous material infiltrated with sulfur that has a crown $S_8$ elemental form and is transitionable to an intermediate polysulfide compound having a structure represented by $Li_2S_n$, wherein 2≤n≤8, via two-electron reduction; and a binder binding together and at least partially encapsulating the porous conductive carbonaceous material and the sulfur to form a physical barrier which at least partially prevents diffusion of the intermediate polysulfide compound from the sulfur cathode;

wherein the binder includes a polymer that is a single-lithium ion conductor formed from a polymeric anion having associated lithium cations;

(b) an anode comprising lithium or a lithium compound;

(c) a separator disposed between and separating the sulfur cathode and the anode; and (d) an electrolyte solution contacting the anode and the sulfur cathode and comprising a nonaqueous solution of lithium salts;

wherein the polymeric anion having associated lithium cations is a polymer having a polysulfone backbone with pendent lithium bis(trifluoromethanesulfonyl)imide groups.

8. The battery according to claim 7, wherein the binder includes only one polymer.

9. A method of operating a device, the method comprising providing electricity to the device from the battery according to claim 7.

10. The method of claim 9, wherein the device is an automotive vehicle.

* * * * *